United States Patent [19]

Tokura et al.

[11] Patent Number: 4,881,149

[45] Date of Patent: Nov. 14, 1989

[54] MOLDED CAPACITOR

[75] Inventors: Koichi Tokura, Osaka; Goro Matsui, Amagasaki, both of Japan

[73] Assignee: Risho Kogyo Co., Ltd., Osaka, Japan

[21] Appl. No.: 262,736

[22] Filed: Oct. 12, 1988

[30] Foreign Application Priority Data

Oct. 23, 1987 [JP] Japan .................................. 62-162873
Oct. 27, 1987 [JP] Japan .................................. 62-163767
Feb. 2, 1988 [JP] Japan .................................. 62-23427

[51] Int. Cl.$^4$ .............................................. H01G 4/38
[52] U.S. Cl. .................................................. 361/328
[58] Field of Search ............... 361/328, 329, 330, 306, 361/326

[56] References Cited

U.S. PATENT DOCUMENTS 3,335,343  8/1967  Moore et al. ................... 361/326 X
3,475,659  10/1969  Buice et al. .......................... 361/328
4,109,291  8/1978  Bozzini .............................. 361/329
4,654,751  3/1987  Tokura et al. ....................... 361/328

FOREIGN PATENT DOCUMENTS 764753  6/1953  Fed. Rep. of Germany ...... 361/328

Primary Examiner—Donald A. Griffin
Attorney, Agent, or Firm—Wenderoth, Lind & Ponack

[57] ABSTRACT

A molded capacitor has capacitor elements mounted in respective inner casings filled with an insulating fluid. The capacitor elements in the inner casings are connected together to form an assembly, and the assembly is molded together in an outer housing. The inner casings may be separately molded, with the assembly of the molded inner casings containing the capacitor elements molded again to form the outer housing. The assembly may also be housed in an outer casing with an insulating gas sealed therein.

10 Claims, 2 Drawing Sheets

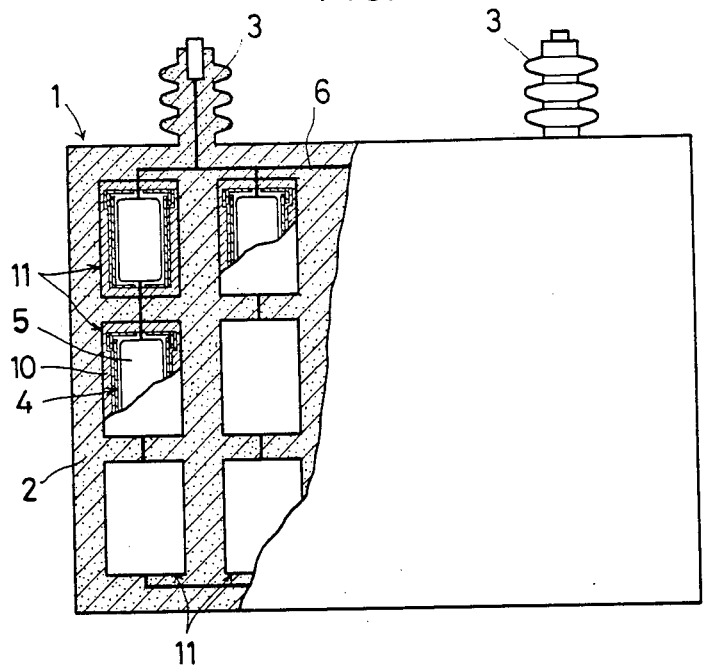
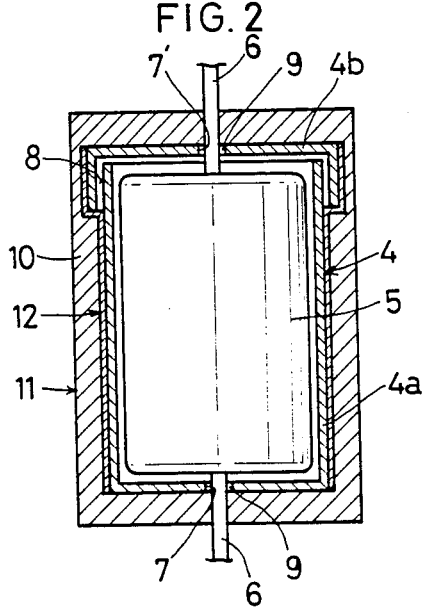

MOLDED CAPACITOR

BACKGROUND OF THE INVENTION

The present invention relates to a molded capacitor.

A molded capacitor is made by connecting a plurality of capacitor elements electrically and molding the assembly with synthetic resin. With this type of capacitor in which the capacitor elements are covered by resin, impregnation of resin at the ends of the capacitor elements has to be sufficient. Otherwise, partial discharge will tend to occur, thus causing breakdown of the capacitor. But it is very difficult or almost impossible to completely impregnate the capacitor elements with synthetic resin at their recessed end portions. Thus, the capacitor elements tend to suffer from corona discharge at their end portions.

With the prior art molded capacitors, this problem is tackled by reducing the voltage assigned to each capacitor element. This increases the number of capacitor elements and makes the capacitor bulky and expensive.

In light of the above drawbacks with prior art molded capacitors, the present inventors have conceived the idea of encasing each capacitor element in a stiff container, filling an insulating gas therein, and molding the containers with synthetic resin.

With prior art molded capacitor, each capacitor element is vacuum-packed in a flexible synthetic resin film pack and an insulating gas is filled in the film pack. With this type capacitor, it is relatively easy to vacuum-pack the capacitor elements and then fill the film packs with an insulating gas. But the insulating gas in the film packs expands or contracts in molding the vacuum-packed capacitor elements with synthetic resin, so that air gaps are liable to develop between the film packs and the molding resin. The air gaps may induce corona discharge. If the film packs are in tight contact with the molding resin and no air gaps develop therebetween, the film packs cannot contract after they have expanded by the temperature rise during molding. This will cause the pressure of the insulating gas in the film packs to drop, thus lowering the corona discharge starting voltage.

SUMMARY OF THE INVENTION

An object of the present invention is to provide a molded capacitor which obviates the above shortcomings.

The inventors have reached a concept of encasing the capacitor elements in a stiff casing having a shape-retaining property, filling an insulating gas in the casing, electrically connecting a plurality of the encased capacitor elements together, and molding the assembly with synthetic resin.

The inventors also noticed the necessity that the casing should have a good adhesion with the molded resin at its outer periphery, and have thereby completed the present invention.

In accordance with the first embodiment of a present invention, there is provided a capacitor comprising a plurality of inner casings having a shape retaining property. Capacitor elements are mounted in respective inner casings, the inner casings being filled with an insulating fluid. The capacitor elements are electrically connected with one another to form an assembly, and an outer housing is formed by molding the assembly with synthetic resin.

In accordance with a second embodiment of the present invention, there is provided a capacitor comprising a plurality of inner casings having a shape retaining property. Capacitor elements are mounted in respective inner casings, the inner casings each filled with an insulating fluid and molded with synthetic resin to seal the insulating fluid therein. The capacitor elements are electrically connected with one another to form an assembly, and an outer housing is formed by molding the assembly with synthetic resin.

In accordance with a third embodiment of the present invention, there is provided a capacitor comprising a plurality of inner casings having a shape retaining property, capacitor elements being mounted in respective inner casings. The inner casings are each filled with an insulating fluid and molded with synthetic resin to seal the insulating fluid therein. The capacitor elements are then electrically connected with one another to form an assembly, and an outer casing is provided for containing the assembly with an insulating gas sealed therein.

The container for the capacitor element is less subject to deformation even if the insulating gas or oil in the container expands and contracts, because not only is it made of a material having a shape retention property or stiffness, but it is also reinforced with the molding resin. The molding resin impregnates a glass fiber material wound around each container so as to improve the bonding strength between the container and the resin molding.

According to the present invention, air gaps hardly develop between the resin molding and the containers. This reduces the possibility of causing corona discharge and makes it possible to increase the voltage assigned to each capacitor element and thus reduce the number of capacitor elements in one capacitor. This makes the capacitor more compact.

Since each of the molded capacitor elements can be tested individually for performance before being connected together, defective elements can be easily picked out before assembly. This will lead to a reduction in the number of defective capacitors.

Further, since each capacitor element is encased in a stiff container having a shape retaining property, the molding resin is kept out of direct contact with metal-sprayed electrical connecting points of the capacitor elements. Thus, the connecting points are less susceptible to the stress produced when the resin molding contracts during hardening.

BRIEF DESCRIPTION OF THE DRAWINGS

Other features and objects of the present invention will become apparent from the following description taken with reference to the accompanying drawings, in which:

FIG. 1 is a sectional view of a first embodiment of a capacitor according to the present invention;

FIG. 2 is an enlarged sectional view of a portion of the capacitor of FIG. 1;

DETAILED DESCRIPTION OF THE INVENTION

Figure 3:
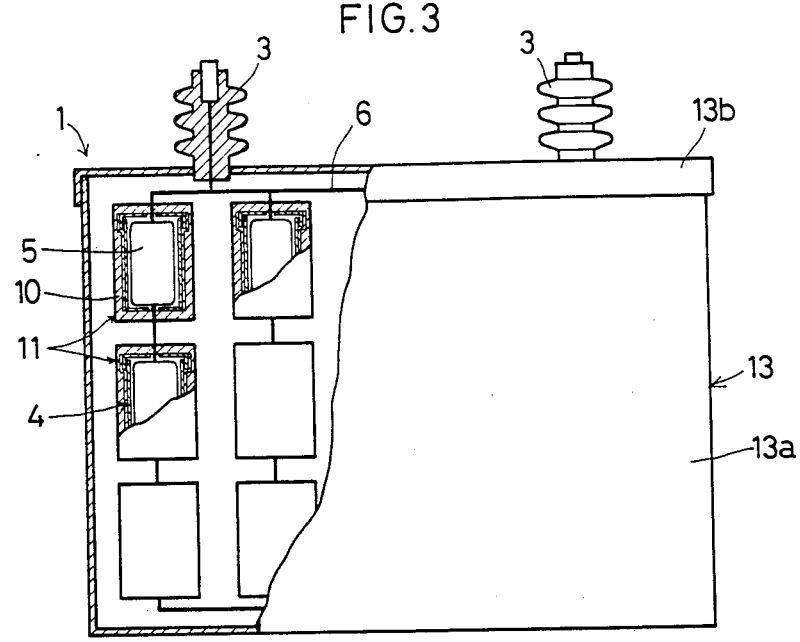
FIG. 3 is a sectional view of a second embodiment according to the present invention.

As shown in FIG. 1, a capacitor 1 in a first embodiment of the present invention comprises a plurality of encased and molded capacitor elements 11 connected together electrically with one another, and an outer housing 2 for the capacitor elements formed by molding a synthetic resin. The outer housing 2 is integrally formed with bushings 3.

As shown in FIG. 2, each encased and molded capacitor element 11 comprises a container or casing 4 and a capacitor element 5 housed therein. The casing 4 is filled with an insulating gas such as SF6 gas or nitrogen gas and has a glass fiber material 12 wound around its outer periphery. This casing is encapsulated in a molding of a synthetic resin so as to hermetically seal the insulating gas. The capacitor element 11 is manufactured in the following manner.

First a casing 4 is prepared. The casing 4 comprises a body 4a having an open top and a lid 4b closing a top opening of the body 4a. The body 4a and the lid 4b are both made of synthetic resin and formed with holes 7 and 7′ for lead wires 6 of the capacitor element 5, respectively. The casing 4 has inner dimensions slightly larger than the outer dimensions of the capacitor element 5, the capacitor element 5 comprising dielectric layers and electrode layers alternately wound in a spiral-shape. The lid 4b is put on the body 4a so that a gap 8 will be formed therebetween. The gap 8 and gaps 9 formed between the lead wires 6 and the holes 7 and 7′ should be large enough to allow the insulating gas to pass into the casing 4 but not so large as to permit the invasion of a highly viscous synthetic resin into the container when the container is molded.

The inner casing 4 should be made of a stiff or rigid material having high heat resistance and insulating and shape-retaining properties, such as polyester resin, polystyrene resin and polycarbonate resin.

After encasing the capacitor element 5 in the body 4a, the lid 4b is put on the body with the lead wires 6 having their ends drawn out of the casing 4 through the holes 7 and 7′.

After the outer surface of the casing 4 has been roughened in a manner which will be described below, the glass fiber material 12 is wound around the outer periphery of the casing 4. The casing is then put in a metal mold and the mold is evacuated. An insulating gas such as SF6 gas or nitrogen gas is admitted into the mold. Then, a highly viscous synthetic resin such as epoxy or urethane resin is poured in between the mold and the casing 4. After the resin has hardened, it is released from the mold.

The casing 4 is thus encapsulated or molded (first molding) in a molding of synthetic resin which serves to fill up the gap 8 between the casing body 4a and the lid 4b and the gaps 9 between the lead wires 6 and the holes 7 and 7′ so as to hermetically seal the insulating gas in the casing 4. A numeral 10 indicates the molded layer.

A plurality of molded capacitor elements 11 thus produced are connected in parallel and series with one another and are put in a metal mold. A synthetic resin (preferably epoxy resin) is poured into the mold (the second molding), hardened and then released from the mold. The molding by the second molding forms an outer housing. The molded capacitor according to the first embodiment is thus made. An insulating oil may be used instead of an insulting gas.

The capacitor of a second embodiment shown in FIG. 3 comprises a plurality of encased and molded capacitor elements 11 of the same type as in the first embodiment. The capacitor elements 11 are housed in a metal casing 13 and an insulating gas such as SF6 gas or nitrogen gas is filled in the casing 13.

The casing 13 comprises a body 13a having its top open and a lid 13b bonded to the body 13a by welding or the like. Bushings 3 are mounted on the lid 13b to connect lead wires 6 from the capacitor elements 11.

With this arrangement, even if the outer casing 13 should lose its gas tightness, the inner casings 4 can keep their respective capacitor elements 11 gas tight. Since the capacitor elements 5 can thus maintain their high insulating property for a long time and are free from moisture even if the moisture invades the outer casing 13, not only will the reliability of the entire capacitor be greatly improved but its service life will also be extended considerably.

On the other hand, even if the insulating gas in one of the inner casings 4 should leak out, the pressurized insulating gas filling the outer casing 13 will serve to keep the gas pressure in the inner casings 4 from dropping. This prevents the corona discharge starting voltage from dropping. Further, even if one of the inner casings 4 should lose its gas tightness, the outer casing 13 will protect the capacitor elements 5 in the inner casings 4 from moisture. The deterioration of the capacitor will thus be prevented.

Figure 4:
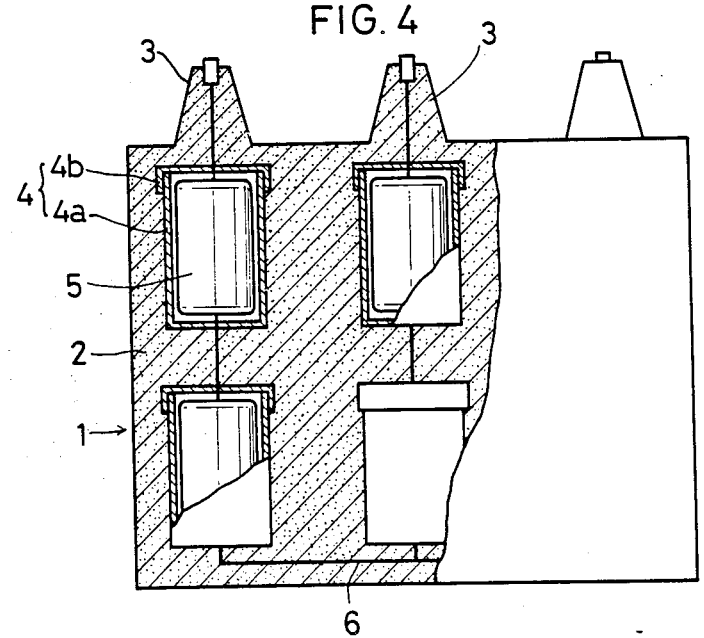
FIG. 4 is a sectional view of the third embodiment according to the present invention.

In a third embodiment shown in FIG. 4, a plurality of capacitor elements 5 are encased in respective casings 4 and are encapsulated in an outer housing 2 formed by molding a synthetic resin such as epoxy resin. This embodiment is different from the first embodiment in that the molding is carried out only once, not twice as in the first embodiment, to hermetically seal the insulating gas. In this embodiment, too, an insulating oil may be used instead of an insulating gas.

In any of the embodiments, the casing 4 comprises the body 4a and the lid 4b and is made of polyester, polystyrene or polycarbonate resin. It has a thickness such that it will not be deformed by expansion and contraction during molding.

In any of the embodiments, the casing 4 should preferably have its outer periphery roughened. The roughened surface may be formed by etching or sandblasting or by electrostatically flocking the outer periphery with short fibers of synthetic resin. Its roughness should be set at about 10–100 microns in terms of the difference of height of high portions or the length of fibers. It is not necessary to roughen the entire outer periphery of the casing 4 but only part of the outer periphery may be roughened where the resin molding is most likely to peel off the casing 4.

In the preferred embodiments, polyester, polystyrene or polycarbonate resin used for the casing shows good adhesion to epoxy resin so that the casing can be strongly bonded to the resin molding.

Further, by the provision of the roughened surface on the outer periphery of the casing, the resin can infiltrate into the the voids of the roughened surface or into between the fiber flocks so as to strengthen the adhesion between the casing and the molding layer.

What is claimed is:

1. A capacitor, comprising:
   a plurality of inner casings, each said inner casing made of a relatively rigid material, and each said inner casing comprising a body portion having an open end and a lid portion covering said open end of said body portion;
   a plurality of capacitor elements, one said capacitor element disposed in each said inner casing;

lead wires electrically connecting said plurality of capacitor elements with one another in an assembly;

each said lid having a hole therethrough and each said body portion having a hole therethrough in a bottom portion thereof for receiving said lead wires therethrough, each said hole sized so as to have a first gap between the wall of said hole and a said lead wire received therethrough, and each said inner casing having a second gap between its body portion and its respective lid portion, said first and second gaps sized sufficiently small so as to allow an electrically insulating gas to pass into said inner casing but sufficiently large so as to prevent molten synthetic resin from passing into said inner casing;

each said inner casing having an electrically insulating gas therein; and an outer casing comprising molded synthetic resin surrounding said plurality of inner casings and sealing said electrically insulating gas in said plurality of inner casings.

2. A capacitor comprising:

a plurality of inner casings, each said inner casing made of a relatively rigid material;

a plurality of capacitor elements electrically connected with one another in an assembly, one said capacitor element disposed in each said inner casing;

an electrically insulating fluid in each said inner casing;

each said inner casing having a first molded synthetic resin therearound sealing and electrically insulating fluid therein; and an outer casing comprising a second molded synthetic resin surrounding said plurality of inner casings.

3. A capacitor comprising:

a plurality of inner casings, each said inner casing made of a relatively rigid material;

a plurality of capacitor elements electrically connected with one another in an assembly, one said capacitor element disposed in each said inner casing;

an electrically insulating fluid disposed in each said inner casing;

each said inner casing having molded synthetic resin therearound sealing said electrically insulating fluid therein; and an outer casing, containing said assembly of inner casings, said outer casing having electrically insulating gas therein surrounding said plurality of inner casings.

4. A capacitor as set forth in any one of claims 1-3, wherein each said inner casing is made of polyester, polystyrene, or polycarbonate resin.

5. A capacitor as claimed in claim 4, and further comprising glass fiber material wound around the outer periphery of each said inner casing.

6. A capacitor as set forth in any one of claims 1-3 wherein at least part of the outer periphery of each said inner casing is roughened.

7. A capacitor as claimed in claim 6, and further comprising glass fiber material wound around the outer periphery of each said inner casing.

8. A capacitor as set forth in any one of claims 1-3, wherein at least part of the outer periphery of each said inner casing is flocked with short fibers.

9. A capacitor as claimed in claim 8, and further comprising glass fiber material wound around the outer periphery of each said inner casing.

10. A capacitor as claimed in any one of claims 1-3, and further comprising glass fiber material wound around the outer periphery of each said inner casing.

* * * * *